(12) United States Patent
Sun

(10) Patent No.: US 12,019,296 B2
(45) Date of Patent: Jun. 25, 2024

(54) OPTICAL FIBER TERMINAL BOX

(71) Applicants: ROSENBERGER (SHANGHAI) TECHNOLOGIES CO., LTD., Shanghai (CN); PROSE TECHNOLOGIES LLC, Mount Olive, NJ (US)

(72) Inventor: Jiwei Sun, Shanghai (CN)

(73) Assignees: ROSENBERGER (SHANGHAI) TECHNOLOGIES CO., LTD., Shanghai (CN); PROSE TECHNOLOGIES LLC, Mount Olive, NJ (US)

(*) Notice: Subject to any disclaimer, the term of this patent is extended or adjusted under 35 U.S.C. 154(b) by 430 days.

(21) Appl. No.: 17/343,273

(22) Filed: Jun. 9, 2021

(65) Prior Publication Data

US 2021/0349274 A1 Nov. 11, 2021

Related U.S. Application Data

(63) Continuation of application No. PCT/CN2021/084891, filed on Apr. 1, 2021.

(30) Foreign Application Priority Data

May 11, 2020 (CN) .......................... 202010393081.1

(51) Int. Cl.
*G02B 6/44* (2006.01)
*G02B 6/38* (2006.01)

(52) U.S. Cl.
CPC ......... *G02B 6/4446* (2013.01); *G02B 6/4441* (2013.01); *G02B 6/4455* (2013.01); *G02B 6/3885* (2013.01); *G02B 6/3893* (2013.01); *G02B 6/3897* (2013.01)

(58) Field of Classification Search
CPC .. G02B 6/4452; G02B 6/4455; G02B 6/4453; G02B 6/4454; G02B 6/4446; G02B 6/4447; G02B 6/4441; G02B 6/4445; G02B 6/444; G02B 6/3885; G02B 6/3893; G02B 6/3897
See application file for complete search history.

(56) References Cited

U.S. PATENT DOCUMENTS

| | | | |
|---|---|---|---|
| 7,367,823 B2* | 5/2008 | Rapp | G02B 6/44524 439/137 |
| 2010/0322580 A1* | 12/2010 | Beamon | G02B 6/4452 385/135 |

(Continued)

*Primary Examiner* — Michelle R Connelly
(74) *Attorney, Agent, or Firm* — ANOVA LAW GROUP, PLLC

(57) ABSTRACT

An optical fiber terminal box configured to be mounted on a guiding structure includes: a box base including two side walls extending in a front-rear direction to form an accommodation space between the two side walls; and an upper cover coupled with the box base. The box base further includes a locking member disposed at an outer surface of each of the two wide walls and configured to lock the optical fiber terminal box to the guiding structure, a cable management member disposed at a front end of the two side walls, and a handle disposed at a front end of the cable management member. When being subject to an external force, the handle drives the locking member to unlock from the guiding structure.

12 Claims, 5 Drawing Sheets

(56) References Cited

U.S. PATENT DOCUMENTS

| | | | | |
|---|---|---|---|---|
| 2014/0003782 A1* | 1/2014 | Blackwell, Jr. | ...... | G02B 6/3897 |
| | | | | 385/135 |
| 2023/0251447 A1* | 8/2023 | Ruiz | ............. | G02B 6/4455 |
| | | | | 385/135 |

* cited by examiner

//  OPTICAL FIBER TERMINAL BOX

CROSS-REFERENCES TO RELATED APPLICATIONS

This application is a continuation of International Application No. PCT/CN2021/084891, filed on Apr. 1, 2021, which claims priority to Chinese Patent Application No. 202010393081.1 filed on May 11, 2020, the entire contents of both of which are incorporated herein by reference.

TECHNICAL FIELD

The present disclosure relates to the technical field of optical fiber communication and, more particularly, to an optical fiber terminal box.

BACKGROUND

With the advent of high-density network requirements, multi-fiber push-on (MPO)/multi-fiber termination push-on (MTP) optical devices become particularly important. As a common MPO/MTP optical device, an MPO/MTP terminal box installed in an optical fiber distribution box satisfies high-density application requirements. The easy-to-install feature of the MPO/MTP terminal box substantially reduces labor cost, and saves installation space and time, thereby becoming an ideal solution for high-density applications.

However, existing optical fiber terminal boxes have the following drawbacks: 1) lack of integrated cable management, requiring an accompanying cable management device, high cost, inflexible configuration, and inconvenient operation; 2) an unlocking device of the optical fiber terminal box is often far away from the cable management device, which requires extra width or height space, thereby causing the existing optical fiber terminal box unable to satisfy extra-high-density wiring requirements, inflexible configuration, and inconvenient operation; 3) constrained by sizes of adapters and sizes of standard wiring system, the standard wiring system having standard one rack unit height (1 U, approximately 44.45 mm) can host at most three layers of optical fiber terminal boxes. Four layers of the optical fiber terminal boxes cannot fit into the 1 U height. To satisfy the extra-high-density requirement of fitting four layers of adapters within 1 U height, each optical fiber terminal box often needs to accommodate two layers of adapters.

SUMMARY

In accordance with the disclosure, there is provided an optical fiber terminal box configured to be mounted on a guiding structure. The optical fiber terminal box includes: a box base including two side walls extending in a front-rear direction to form an accommodation space between the two side walls; and an upper cover coupled with the box base. The box base further includes a locking member disposed at an outer surface of each of the two wide walls and configured to lock the optical fiber terminal box to the guiding structure, a cable management member disposed at a front end of the two side walls, and a handle disposed at a front end of the cable management member. When being subject to an external force, the handle drives the locking member to unlock from the guiding structure.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

Figure 1:
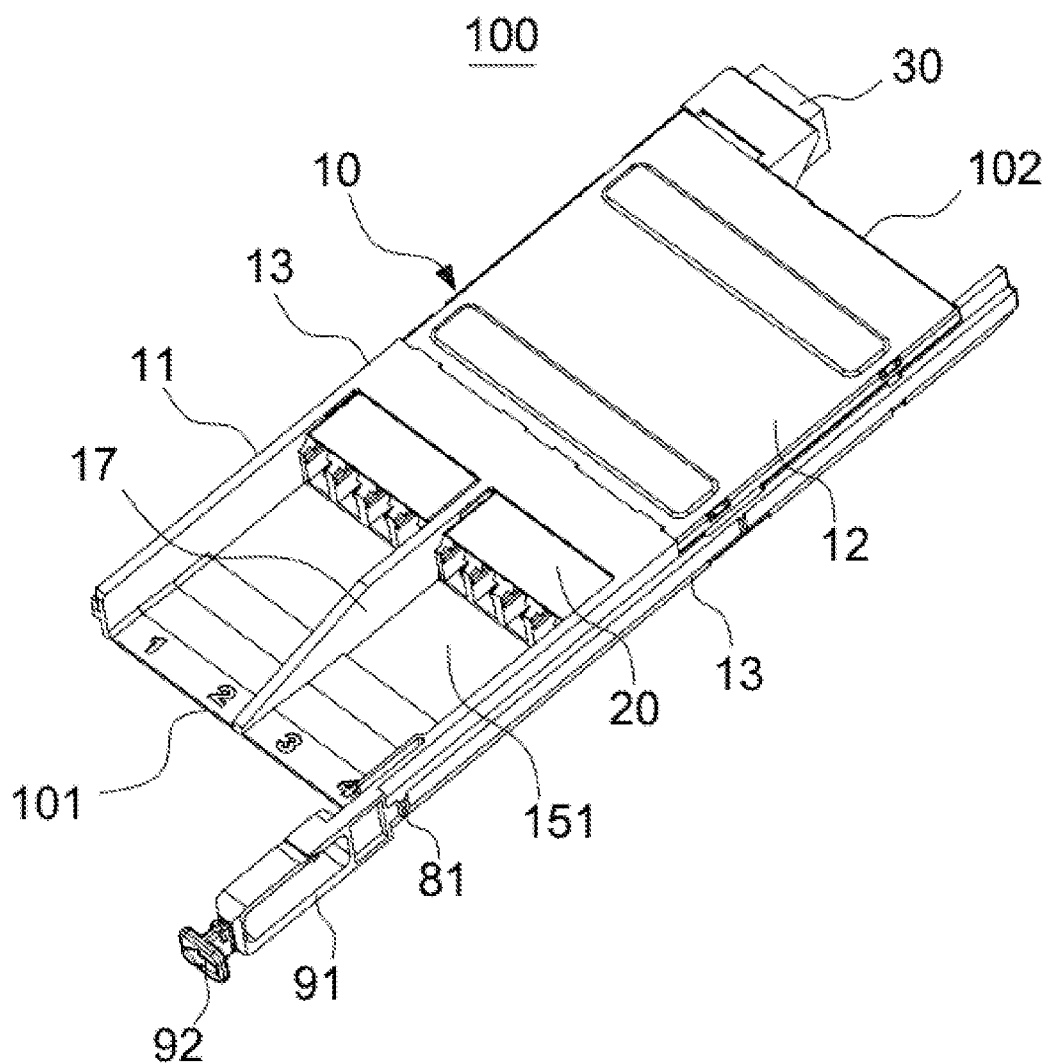
FIG. 1 is a three-dimensional (3D) structural diagram of an optical fiber terminal box assembly according to an exemplary embodiment of the present disclosure.
Figure 2:
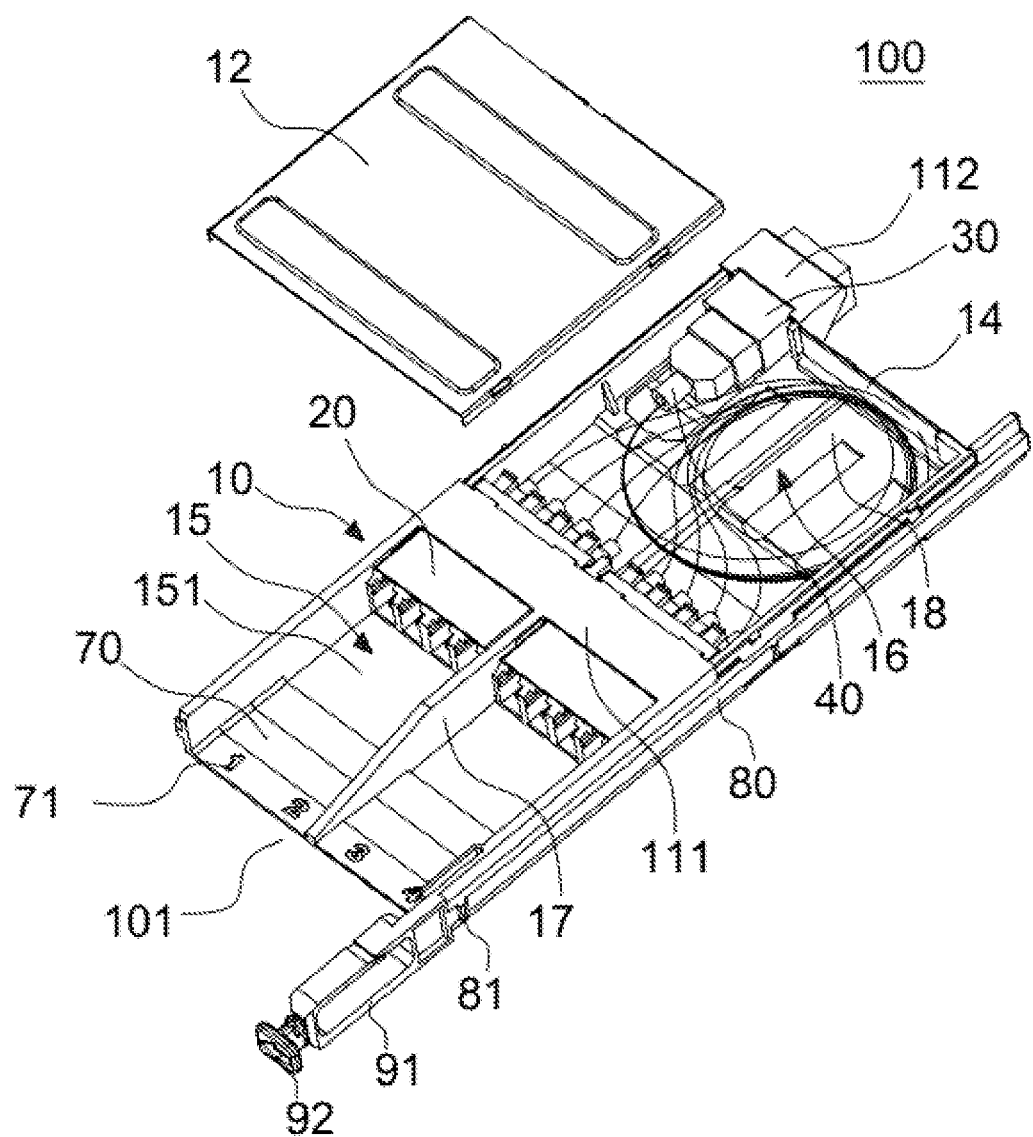
FIG. 2 is a 3D exploded perspective view of the optical fiber terminal box assembly shown in FIG. 1.
Figure 3:
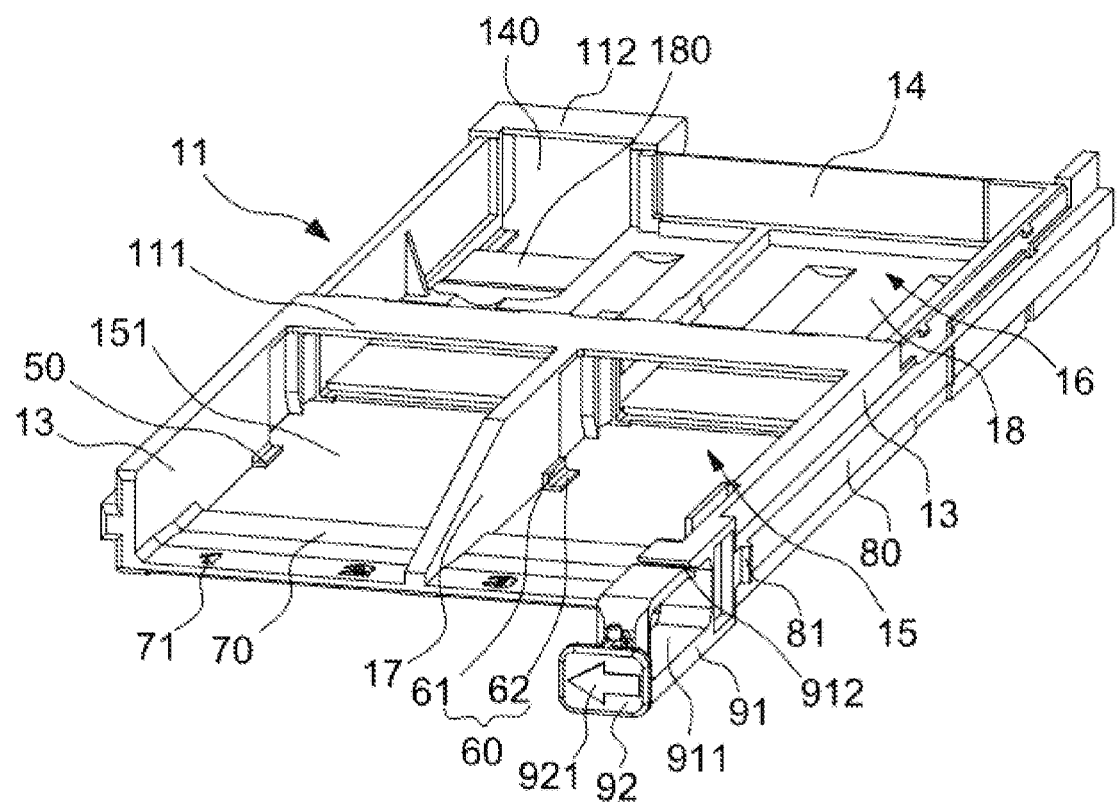
FIG. 3 is a 3D structural diagram of a box base shown in FIG. 2.
Figure 4:
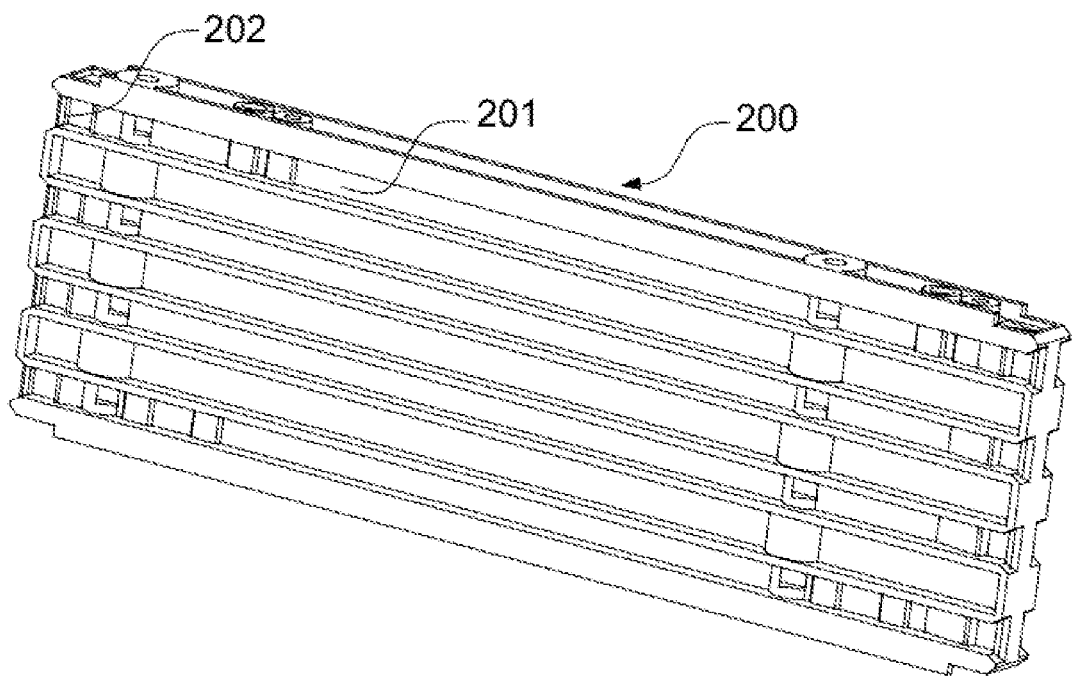
FIG. 4 is a 3D structural diagram of a guiding structure according to an exemplary embodiment of the present disclosure.
Figure 5:
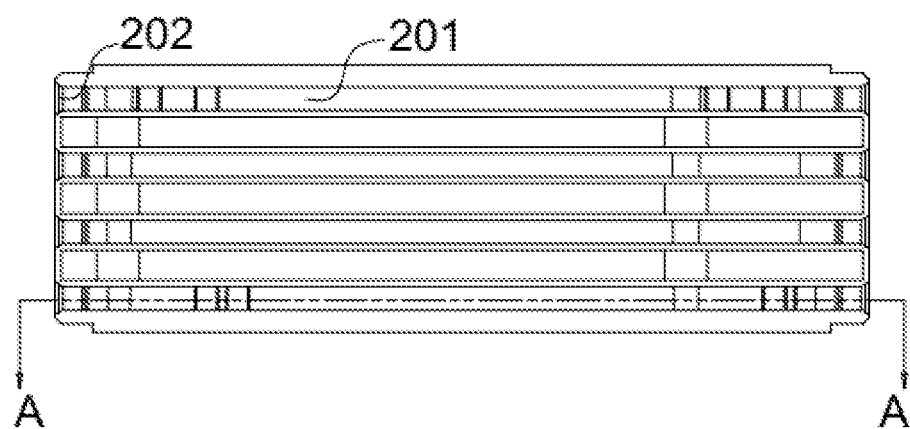
FIG. 5 is a top view of the guiding structure shown in FIG. 4.
Figure 6:
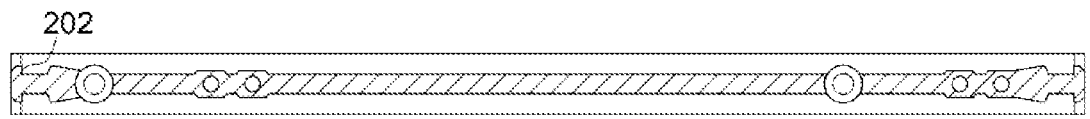
FIG. 6 is a cross-sectional view of the guiding structure shown in FIG. 5 along the A-A direction.

Reference numerals: 100: optical fiber terminal box assembly, 10: optical fiber terminal box, 11: box base, 12: upper cover, 101: front end, 102: rear end, 13: side wall, 14: rear wall, 140: open slot, 15: first accommodation space, 151: first accommodation sub-space, 16: second accommodation space, 17: partition wall, 18: bottom wall, 180: support groove, 80: guiding rib, 81: locking member/protrusion, 111: first limit member, 112: second limit member, 50: first support member, 60: second support member, 61: first support arm, 62: second support arm, 70: reinforcement frame, 71: operation instruction structure, 91: cable management member, 911: cable management hole, 912: opening, 92: handle, 921: unlocking instruction label, 20: first adapter, 30: second adapter, 40: second branch jumper, 200: guiding structure, 201: guiding groove, 202: locking stopper.

DETAILED DESCRIPTION OF THE EMBODIMENTS

Embodiments of the present disclosure are described in detail below with reference to the accompanying drawings. Same or similar reference numerals in the drawings represent the same or similar elements or elements having the same or similar functions throughout the specification. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

As shown in FIGS. 1-6, the present disclosure provides a high-density wiring system. The wiring system includes an optical fiber terminal box assembly 100 and a guiding structure 200. The guiding structure 200 has a vertical height of 1 U. 1 U refers to one rack unit height and may be approximately 44.45 mm. The optical fiber terminal box assembly 100 is installed between two guiding structures 200. In one embodiment, the high-density wiring system includes two guiding structures 200 and four optical fiber terminal box assemblies 100 arranged between the two guiding structures 200. The guiding structure 200 includes a front end and a rear end facing toward each other. Each guiding structure 200 includes four guiding grooves 201. Each guiding groove 201 extends from the front end to the rear end of the guiding structure 200. The four guiding grooves 201 are orderly arranged in parallel along a top-bottom direction. The four guiding grooves 201 of one of the two guiding structures 200 are disposed opposite to the four guiding grooves 201 of the other of the two guiding structures 200. The four optical fiber terminal box assemblies 100 can be orderly installed between the two guiding structures 200 in the top-bottom direction. Two opposite sides of each optical fiber terminal box assembly 100 are respectively installed in the two opposing guiding grooves 201 of the two guiding structures 200. Each optical fiber terminal box assembly 100 is able to slide in the two opposing guiding grooves of the two guiding structures 200 in a front-rear direction.

The optical fiber terminal box assembly 100 includes an optical fiber terminal box 10 and further includes two first adapters 20, a second adapter 30, a first branch jumper (not shown), and a second branch jumper 40, all of which are mounted in the optical fiber terminal box 10. The optical fiber terminal box 10 includes a front end 101 and a rear end 102 facing toward each other. The optical fiber terminal box 10 further includes a box base 11 and an upper cover 12 disposed on top of the box base 11. The box base 11 includes two side walls 13, a rear wall 14, and a bottom wall 18. The two side walls 13 extend in the front-rear direction to form an accommodation/storage space.

The accommodation space includes a first accommodation space 15 and a second accommodation space 16 arranged in the front-rear direction. The first accommodation space 15 is disposed in front of the second accommodation space 16 (i.e., the first accommodation space 15 is disposed closer to the front end 101 than the second accommodation space 16). The first accommodation space 15 includes openings in the top-bottom direction. The box base 11 further includes a partition wall 17 disposed between the two side walls 13 and inside the first accommodation space 15. The partition wall 17 extends in the front-rear direction, and divides the first accommodation space 15 into two first accommodation sub-spaces 151. The two first accommodation sub-spaces 151 are connected to the second accommodation space 16 in the front-rear direction. The two first accommodation sub-spaces 151 include openings in the top-bottom direction.

The two first adapters 20 are disposed inside the two first accommodation sub-spaces 151 respectively. The first branch jumper is disposed inside the two first accommodation sub-spaces 151. One end of the first branch jumper (not shown) is connected to the two first adapters 20 and another end of the first branch jumper extends out of front openings of the two first accommodation sub-spaces 151. The second adapter 30 is disposed inside the second accommodation space 16. The second branch jumper 40 is disposed inside the second accommodation space 16. One end of the second branch jumper 40 is connected to the two first adapters 20, and another end of the second branch jumper 40 is connected to the second adapter 30. In some embodiments, the second branch jumper 40 may include multiple connectors at one end with multiple threads/branches of fibers and one or more connectors at the other end.

The box base 11 further includes a support member disposed inside each first accommodation sub-space 151. The support member is used to support the first adapter 20. The support member includes a first support member 50 and a second support member 60. The first support member 50 protrudes from an inner surface of the side wall 13 into the first accommodation sub-space 151. The first support member 50 is disposed at a bottom surface adjacent to the side wall 13. The second support member 60 protrudes from a side surface of the partition wall 17 into the first accommodation sub-space 151. The second support member 60 is disposed at the bottom surface adjacent to the partition wall 17.

The bottom of the first adapter 20 contacts the first support member 50 and the second support member 60. That is, the first support member 50 and the second support member 60 together support the first adapter 20. The first support member 50 and the second support member 60 may be implemented in various forms and structures. In one embodiment, the second support member 60 has an L-shape, and includes a first support arm 61 extending in the top-bottom direction and a second support arm 62 extending in a horizontal direction. The first support arm 61 is attached to the side surface of the partition wall 17. The second support arm 62 protrudes from the bottom of the first support arm 61 into the first accommodation sub-space 151.

The box base 11 further includes a first limit member 111 disposed at an upper portion of the first accommodation sub-space 151. The first limit member 111 extends horizontally in a direction perpendicular to the front-rear direction, and connects to the side walls 13 and the partition wall 17. The first limit member 111 is disposed adjacent to the second accommodation space 16. The first limit member 111 is disposed on top of the first adapter 20. The first limit member 111 and the support member together constrain the first adapter 20.

In the embodiments of the present disclosure, the first accommodation sub-space 151 includes openings in the top-bottom direction. The first support member 50 and the second support member 60 are disposed inside the first accommodation sub-space 151 to support the first adapter 20. The first limit member 111 is disposed in the upper portion of the first accommodation sub-space 151 to constrain the first adapter 20. Thus, an ultra-thin design of the optical fiber terminal box assembly 100 is achieved.

A reinforcement frame 70 is disposed at the front of each first accommodation sub-space 151. The reinforcement frame 70 extends horizontally in the direction perpendicular to the front-rear direction and connects to the side walls 13 and the partition wall 17 of the box base 11. The reinforcement frame 70 includes an operation instruction structure 71. The operation instruction structure 71 is used to instruct a user positions to operate the first branch jumper. The operation instruction structure 71 may be implemented in digits, letters, or other suitable instruction elements. In one embodiment, the operation instruction structure 71 includes digit instructions 1, 2, 3, and 4. When performing maintenance operations on the first branch jumper, the user can be intuitively informed about a position of a branch being operated in the first branch jumper based on the digit instructions.

The second accommodation space 16 is formed by the bottom wall 18, the two side walls 13, and the rear wall 14. The rear wall 14 includes an open slot 140 penetrating through the front-rear direction. The open slot 140 is disposed at the rear wall 14 adjacent to the side wall 13. The box base 11 further includes a second limit member 112 disposed above the open slot 140. The second limit member 112 extends horizontally in the direction perpendicular to the front-rear direction, and connects the side wall 13 with the rear wall 14. A support groove 180 is formed at the bottom wall adjacent to the open slot 140. The second adapter 30 is supported in the support groove 180. One end of the second adapter 30 penetrates the open slot 140. The second limit member 112 is disposed on top of the second adapter 30 to constrain the second adapter 30. The upper cover 12 covers on top of the second accommodation space 16. A front side of the upper cover 12 contacts the first limit member 111 and a rear side of the upper cover 12 contacts the rear wall 14.

The box base 11 further includes a guiding rib 80 protruding outward from an outer surface of each side wall 13. The guiding rib 80 can be accommodated in the guiding groove 201 of the guiding structure 200. The optical fiber terminal box 10 is guided by the guiding ribs 80 to move back and forth along the guiding grooves 201. The guiding rib 80 extends from the rear end 102 of the box base 11 to the front end 101 of the box base 11. As such, the movement of the optical fiber terminal box 10 is guided smoothly.

The box base 11 further includes a locking member 81 to lock the optical fiber terminal box 10 to the guiding structure 200. In one embodiment, the locking member is a protrusion 81 protruding outward from each guiding rib 80. A locking stopper 202 is disposed in each guiding groove 201 of the guiding structure 200. When the guiding rib 80 moves in the guiding groove 201 to a certain position, the protrusion 81 and the locking stopper are engaged to lock the optical fiber terminal box 10 in the guiding structure 200. In one embodiment, the protrusion 81 is disposed at the front end of the guiding rib 80. Correspondingly, the locking stopper 202 is disposed at the front end of the guiding groove 201.

The box base 11 further includes a cable management member 91 disposed at one of the side walls 13 and a handle 92 disposed at the front end of the cable management member 91. The side wall 13, the cable management member 91, and the handle 92 are integrally formed. In one embodiment, the cable management member 91 has a ring shape and has an opening 912. The cable management member 91 is used to organize the first branch jumper.

The cable management member 91 includes a cable management hole 911 penetrating horizontally in the direction perpendicular to the front-rear direction for the first branch jumper to pass through. The first branch jumper passes through the opening 912 at the cable management member 91 to enter the cable management hole 911. For example, the first branch jumper passes through the cable management hole 911 to enter the two first accommodation sub-spaces 151 of the box base 11 from a side of the box base 11. In another example, the first branch jumper passes through the cable management hole 911 and extends out of the two first accommodation sub-spaces 151 of the box base 11 to the side of the box base 11. The handle 92 is disposed at the front end of the cable management member 91. The cable management member 91 is disposed at the front end of the locking member 81. The locking member 81 is disposed adjacent to the cable management member 91.

When unlocking, the user operates the handle 92 inward (i.e., in a direction approaching the first accommodation space 15 of the box base 11). The handle 92 drives the cable management member 91 and the locking member 81 on the side wall 13 to move inward, such that the locking member 81 is separated from the locking stopper 202 in the guiding groove 201. Thus, the optical fiber terminal box 10 is unlocked from the guiding structure 200. After being unlocked, the user operates the handle 92 to pull forward the optical fiber box 10. The guiding rib 80 of the optical fiber terminal box 10 moves forward along the guiding groove 201, such that the optical fiber terminal box 10 is pulled out of the guiding groove 201 of the guiding structure 200. An unlocking instruction label 921 is disposed at the front end of the handle 92 for indicating the direction of operating the handle 92. In one embodiment, the unlocking instruction label 921 is an arrow pointing inward.

In one embodiment, the first adapter 20 is a Lucent connector (LC) adapter. The second adapter 30 is an MPO adapter. The second branch jumper 40 is an MPO-LC branch jumper. Correspondingly, the optical fiber terminal box is an MPO-LC optical fiber terminal box. In some other embodiments, based on the type of the optical fiber connectors that need to be connected, the types of the first adapter 20 and the second adapter 30 maybe different to form other types of the optical fiber terminal boxes, such as MPO-MDC optical fiber terminal boxes, MPO-SN optical fiber terminal boxes, MPO-SC optical fiber terminal boxes, and MPO-E2000 optical fiber terminal boxes. The MDC optical fiber connector is a mini duplex connector. The SN optical fiber connector is a small form factor duplex connector designed by SENKO Advanced Components. The SC optical fiber connector is a Subscriber Connector, a Square Connector, or a Standard Connector. The E2000 optical fiber connector is a type of optical fiber connectors featuring a spring-loaded shutter which fully protects the ferrule from dust and scratches.

Figure 7:
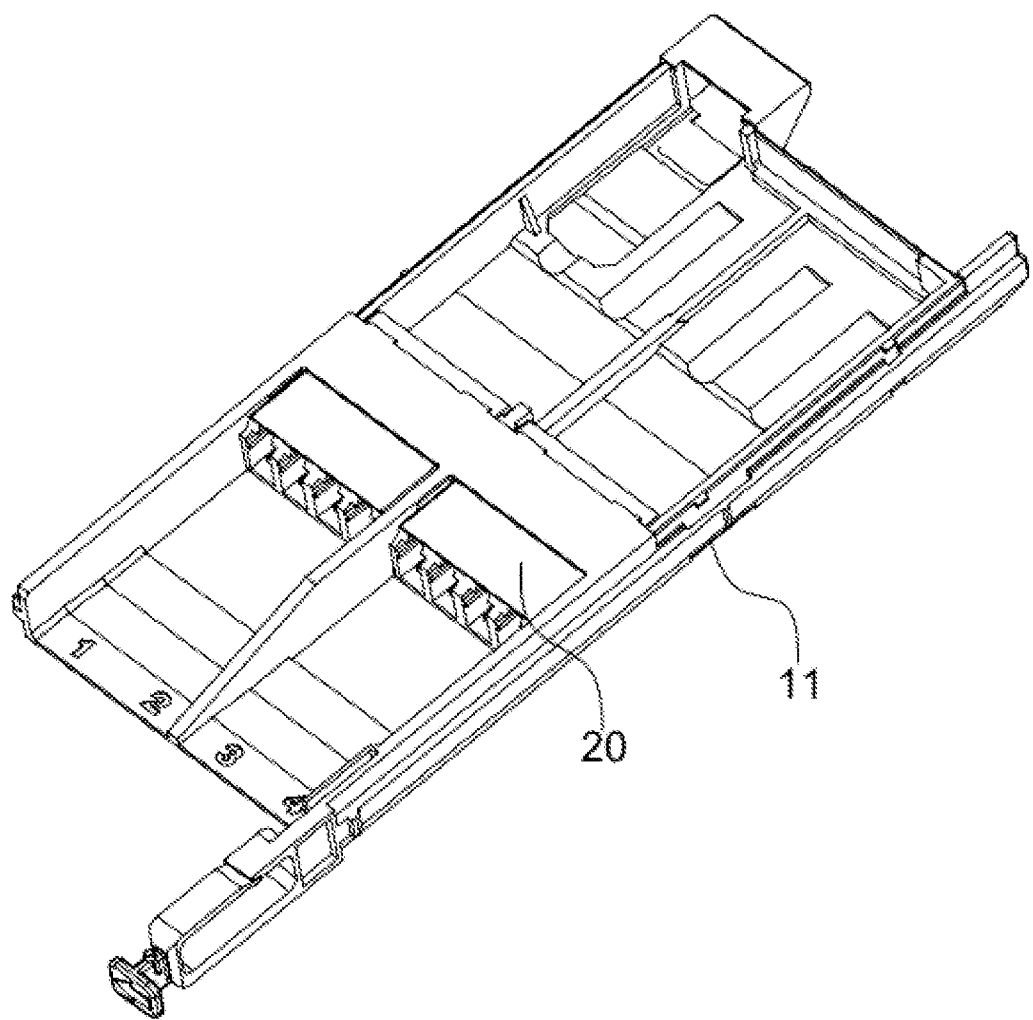
FIG. 7 is a 3D structural diagram of an optical fiber terminal box assembly according to another exemplary embodiment of the present disclosure.

In some embodiments, as shown in FIG. 7, the box base 11 may be equipped with the first adapter 20, such as LC adapters, to form an LC adapter patch panel to be mounted on the guiding structure 200, thereby achieving fitting four layers of the high-density LC adapter patch panel within 1 RU. In some other embodiments, the first adapter 20 may be modified to different types to handle different types of optical connectors, such as the MPO adapter, the SC adapter, and the E2000 adapter to form corresponding adapter patch panels.

In the embodiments of the present disclosure, the locking member 81 of the optical fiber terminal box 10 is disposed at the outer side of the side wall 13 of the box base 11. The cable management member 91 is disposed at the front end of the side wall 13. The handle 92 for unlocking is disposed at the front end of the cable management member 91. The side wall 13, the cable management member 91, and the handle are integrally formed to facilitate organizing the jumper cables and maintenance operation. Operations such as single-hand unlocking and pulling out can be achieved. Functions such as unlocking and cable management are integrated without increasing the overall size while reducing the overall cost. In addition, the ultra-thin design of optical fiber terminal box assembly 100 has a height less than 11 mm (the height is controlled within 10.5 mm). Thus, the high-density configuration of fitting four optical fiber terminal box assemblies 100 within 1 U height of the guiding structure 200 is achieved.

The present disclosure has the following beneficial effects. 1. The locking member of the optical fiber terminal box is disposed at the outer surface of the side wall of the box base. The cable management member is disposed at the front end of the side wall. The handle for unlocking is disposed at the front end of the cable management member. The side wall, the cable management member, and the handle are integrally formed to facilitate organizing the jumper cables and maintenance operation. Operations such as single-hand unlocking and pulling out can be achieved. Functions such as unlocking and cable management are integrated without increasing the overall size while reducing the overall cost. 2. The first accommodation sub-spaces include openings in the top-bottom direction. The support structures of the adapters are disposed on the side walls and the partition wall. The design reduces the overall thickness of the optical fiber terminal box, satisfies the ultra-thin requirement, and achieves fitting four layers of independent optical fiber terminal boxes within 1 RU. 3. Operation instruction structure is disposed at the box base. The jumper cable operation is visualized during the operation, such that the user intuitively knows the positions to operate the branch jumpers based on the operation instruction structure.

The above-described embodiments are only some of the embodiments of the present disclosure, which should not be used to limit the scope of present disclosure. Therefore, equivalent changes made according to the claims of the present disclosure still fall within the scope of the present disclosure.

What is claimed is:

1. An optical fiber terminal box configured to be mounted on a guiding structure, the optical fiber terminal box comprising:
 a box base including two side walls extending in a front-rear direction to form an accommodation space between the two side walls;
 an upper cover coupled with the box base;
 wherein: the box base further includes a locking member disposed at an outer surface of at least one of the two side walls and configured to lock the optical fiber terminal box to the guiding structure, a cable management member disposed at a front end of the two side walls, and a handle disposed at a front end of the cable management member; and when being subject to an external force, the handle drives the locking member to lock or unlock from the guiding structure; and
 wherein: the accommodation space includes a first accommodation space and a second accommodation space positioned next to each other along the front-rear direction; and the first accommodation space includes two first accommodation sub-spaces defined by a partition wall extending along the front-rear direction.

2. The optical fiber terminal box according to claim 1, wherein: the side wall, the cable management member, and the handle are integrally formed.

3. The optical fiber terminal box according to claim 1, wherein: the box base further includes a guiding rib to engage with a guiding groove of the guiding structure.

4. The optical fiber terminal box according to claim 3, wherein: a locking stopper is disposed in the guiding groove; and the locking member and the locking stopper are engaged to lock or unlock the optical fiber terminal box to or from the guiding structure.

5. The optical fiber terminal box according to claim 3, wherein the guiding rib protrudes outward from each of the two side walls.

6. The optical fiber terminal box according to claim 1, wherein: the handle includes an unlocking instruction label.

7. The optical fiber terminal box according to claim 1, wherein: at least one of the two first accommodation sub-spaces has an opening in a top-bottom direction.

8. The optical fiber terminal box according to claim 1, wherein: the the box base further includes a first support member and a second support member.

9. The optical fiber terminal box according to claim 8, wherein:
 the first support member protrudes from an inner surface of the side wall into the first accommodation sub-space; and the second support member protrudes from a side surface of the partition wall into the first accommodation sub-space.

10. The optical fiber terminal box according to claim 1, wherein:
 the box base further includes a first limit member to connect the side walls and the partition wall.

11. The optical fiber terminal box according to claim 1, wherein: the box base further includes and a second limit member; and the second limit member connects the side walls and a rear wall.

12. The optical fiber terminal box according to claim 1, further comprising: a reinforcement frame to connect the side walls and the partition wall.

* * * * *